Jan. 17, 1967 — G. A. RATH — 3,299,342
SEMICONDUCTOR VOLTAGE REGULATOR
Original Filed Sept. 14, 1962 — 2 Sheets-Sheet 1

INVENTOR.
Gerald A. Rath
BY C. R. Meland
HIS ATTORNEY

INVENTOR.
Gerald A. Rath
BY C. R. Meland
HIS ATTORNEY

United States Patent Office 3,299,342
Patented Jan. 17, 1967

3,299,342
SEMICONDUCTOR VOLTAGE REGULATOR
Gerald A. Rath, Anderson, Ind., assignor to General Motors Corporation, Detroit, Mich., a corporation of Delaware
Continuation of application Ser. No. 223,746, Sept. 14, 1962. This application Nov. 12, 1965, Ser. No. 507,486
2 Claims. (Cl. 322—28)

This application is a continuation of application Serial No. 223,746, filed on September 14, 1962, now abandoned.

This invention relates to voltage regulators and more particularly to a voltage regulator for controlling the energization of the field winding of a generator.

In certain types of electrical systems where a generator supplies various electrical loads, it is important that the system be designed such that upon a failure of the voltage regulator, the output voltage of the generator will not go out of control. This is particularly important where the loads may include semiconductors which cannot tolerate high voltages and which are relatively expensive.

It accordingly is one of the objects of this invention to provide a voltage regulator for a generator which removes all field power in the event of a failure of the voltage regulator.

Another object of this invention is to provide a voltage regulator for a generator or the like wherein the field power is supplied by a bridge circuit that includes diodes and controlled rectifiers. This circuit is arranged such that if one of the controlled rectifiers should short, one of the diodes is connected in series with a circuit breaker and directly across A.C. input lines with the result that the circuit breaker opens. This removes all field power from the field winding of the generator so that the output voltage of the generator is reduced to substantially zero output.

Still another object of this invention is to provide a voltage regulator for a generator wherein the field winding is supplied with electrical power from a bridge circuit that includes controlled rectifiers and diodes and wherein the conduction of the controlled rectifiers is controlled by a magnetic amplifier.

Further objects and advantages of the present invention will be apparent from the following description, reference being had to the accompanying drawings wherein a preferred embodiment of the present invention is clearly shown.

Figure 1:
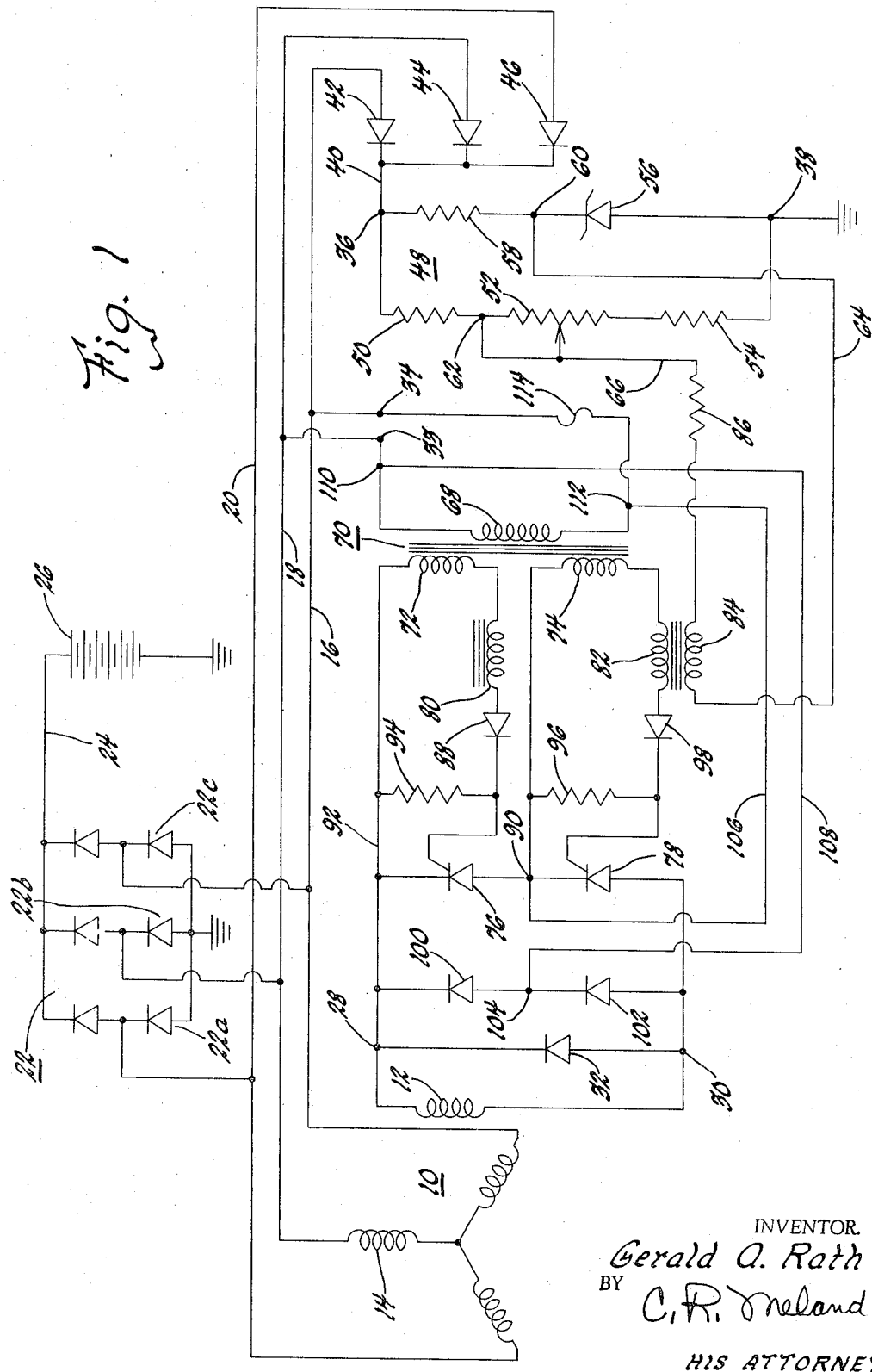
FIGURE 1 is a schematic circuit diagram of a voltage regulation system made in accordance with this invention.

Referring now to the drawings and more particularly to FIGURE 1, the reference numeral 10 generally designates an alternating current generator which has a field winding 12 and a three-phase Y-connected output winding 14. The generator 10 may be of any well-known type and will have a rotor member which is driven. The generator can be driven by the internal combustion engine on a motor vehicle and will supply D.C. loads in a manner to be more fully described hereinafter.

The phase windings of the output winding 14 are connected respectively with lead wires or conductors 16, 18 and 20. It is seen that the conductors 16, 18 and 20 feed a three-phase full wave bridge rectifier network 22 which has one D.C. output terminal that is grounded and another D.C. output terminal connected with conductor 24. The six diodes that make up the bridge rectifier 22 are preferably the PN junction semiconductor type and may be of the silicon type. It is seen that the conductor 24 feeds a D.C. load 26 which is connected between the conductor 24 and ground. The D.C. load in this instance is shown as a battery but it could be other various D.C. loads that are found on various types of motor vehicles. In this connection, it is noted that the term motor vehicle is intended to cover land vehicles, boats and ships and aircraft.

The voltage regulator of this invention has output terminals 28 and 30 which are connected with opposite ends of the field winding 12. These output terminals 28 and 30 as will become more readily apparent hereinafter supply direct current to the field winding 12 and this direct current is controlled in accordance with the output voltage of the output winding 14. It is seen that a diode 32 is connected across output terminals 28 and 30 and this diode is a transient voltage suppressing diode for the field winding 12.

The voltage regulator has A.C. input terminals 33 and 34 which are connected with conductors 16 and 18 to be supplied with single phase A.C. voltage from the output winding 14. The regulator has D.C. input terminals 36 and 38 which are fed with a D.C. voltage that is proportional to the output voltage of the output winding 14. It is seen that the input terminal 38 is grounded whereas the input terminal 36 is connected with a lead wire 40.

The lead wire 40 is connected to one side of diodes 42, 44 and 46. The opposite side of diodes 42, 44 and 46 are connected respectively with conductors 16, 18 and 20. It can be seen that the diodes 42, 44 and 46 together with diodes 22a, 22b and 22c provide a rectifying network such that a D.C. voltage will appear between junction 36 and ground that is proportional to the output voltage of the output winding 14. This voltage then can be used as a D.C. sense voltage for the regulator.

The D.C. sense voltage is applied to a voltage sensing circuit generally designated by reference numeral 48. This voltage sensing circuit includes resistor 50, potentiometer resistor 52, resistor 54, Zener diode 56, and resistor 58. The input to the voltage sensing circuit is taken between terminals 36 and 38 and the output of this voltage sensing circuit is taken between terminals 60 and 62 connected respectively with lead wires 64 and 66. The resistor 52 may be adjusted to set the regulating point of the regulator and an error voltage will be developed between junctions 60 and 62 whenever the output voltage of output winding 14 is above or below the desired regulated value.

The A.C. input terminals 33 and 34 are connected with the primary winding 68 of a transformer 70. This transformer has secondary windings 72 and 74 which are operative to supply gate power for a pair of silicon controlled rectifiers 76 and 78.

The gate voltage which is applied to controlled rectifiers 76 and 78 is controlled by a magnetic amplifier which has gate or load windings 80 and 82 and a control winding 84. The gate windings 80 and 82 are wound on separate magnetic cores and the control winding 84 may be wound common to both cores or may be wound as two separate series windings wound respectively on each core. It can be seen that the control winding 84 is fed from lead wires 64 and 66 through a resistor 86. The current that flows through the control winding 84 is therefore a function of the amount of error voltage developed by the voltage reference bridge 48.

The gate electrode of controlled rectifier 76 is connected to one side of the gate winding 80 of the magnetic amplifier through a diode 88. The anode of controlled rectifier 76 is connected with junction 90 and this junction is connected to one side of secondary winding 74. The cathode of controlled rectifier 76 is connected with lead wire 92 which is connected with one side of the secondary winding 72. A resistor 94 connects the gate and cathode electrodes of the controlled rectifier 76. In a similar fashion, a resistor 96 connects the gate and cathode electrodes of controlled rectifier 78. It is seen that the gate electrode of controlled rectifier 78 is connected to one side of the load winding 82 of the magnetic amplifier through diode 98.

It will be appreciated that the gate to cathode voltages of the controlled rectifiers 76 and 78 are controlled by the load windings of the magnetic amplifier. When the magnetic amplifier saturates, a voltage is applied across the gate and cathode electrodes of one of the controlled rectifiers to turn it on. The controlled rectifiers are turned on alternately during different parts of the A.C. cycle and the point at which they are turned on is determined by the firing angle of the magnetic amplifier and this firing angle is determined by the current flowing in the control winding 84.

The controlled rectifiers 76 and 78 together with diodes 100 and 102 form a single phase, full wave bridge rectifier network having output terminals connected with junctions 28 and 30 and having input terminals 90 and 104. It is seen that the input terminals 90 and 104 are connected with lead wires 106 and 108 which are fed with an A.C. voltage from junctions 110 and 112.

The operation of the system of FIGURE 1 will now be described. It will be appreciated that the output voltage of the bridge network which is comprised of controlled rectifiers 76 and 78 and diodes 100 and 102 will be dependent upon the relative "on" times of the controlled rectifiers 76 and 78. In other words, the average output voltage of this bridge rectifier is determined by the length of time during each half cycle that the controlled rectifiers are turned on or conducting.

The length of time that the controlled rectifiers are turned on is determined by the firing angle of the magnetic amplifier and this firing angle is determined by the current flow through the control winding 84. The current through control winding 84 is determined by the error voltage or output voltage of the voltage reference bridge 48 and its output voltage is determined by the output voltage of the output winding 14.

If the output voltage of the output winding 14 is higher than the desired regulated value as determined by the setting of the potentiometer resistor 52, a chain of events is set into motion which will decrease the "on" time of controlled rectifiers 76 and 78 to therefore reduce the field current for the field winding 12. On the other hand, if the output voltage is below the desired regulated value, the "on" time of the controlled rectifiers 76 and 78 is increased to therefore increase the current applied to field winding 12 with an increase of the output voltage of generator 10.

If one of the controlled rectifiers, for example, controlled rectifier 76 should short, the circuit breaker 114 will open. This circuit breaker is shown as a fuse but it could be of other types. If controlled rectifier 76 should become shorted, a circuit can be traced from junction 110, through lead wire 108, through junction 104, through diode 100, through the shorted controlled rectifier 76, and then through lead wire 106 to junction 112. It can be seen that when the controlled rectifier 76 is shorted, the diode 100 is connected directly across the conductors 106 and 108 and is connected in series with the circuit breaker 114. This will cause the circuit breaker to open and will remove the field energization for the generator 10 with the exception of the residual magnetism of the field structure.

If controlled rectifier 78 should fail by shorting, the diode 102 would be connected directly across conductors 106 and 108 and in series with the circuit breaker 114 so that the circuit breaker would once more open.

The forward current rating of diodes 100 and 102 must be greater than that of the circuit breaker or fuse 114.

It can be seen from the foregoing that the regulating system is fail-safe in that the failure of the controlled rectifiers will cause the energization of the field to be reduced substantially to zero. This prevents the output voltage of the generator from going completely out of control in the event of a failure of the controlled rectifiers.

Figure 2:
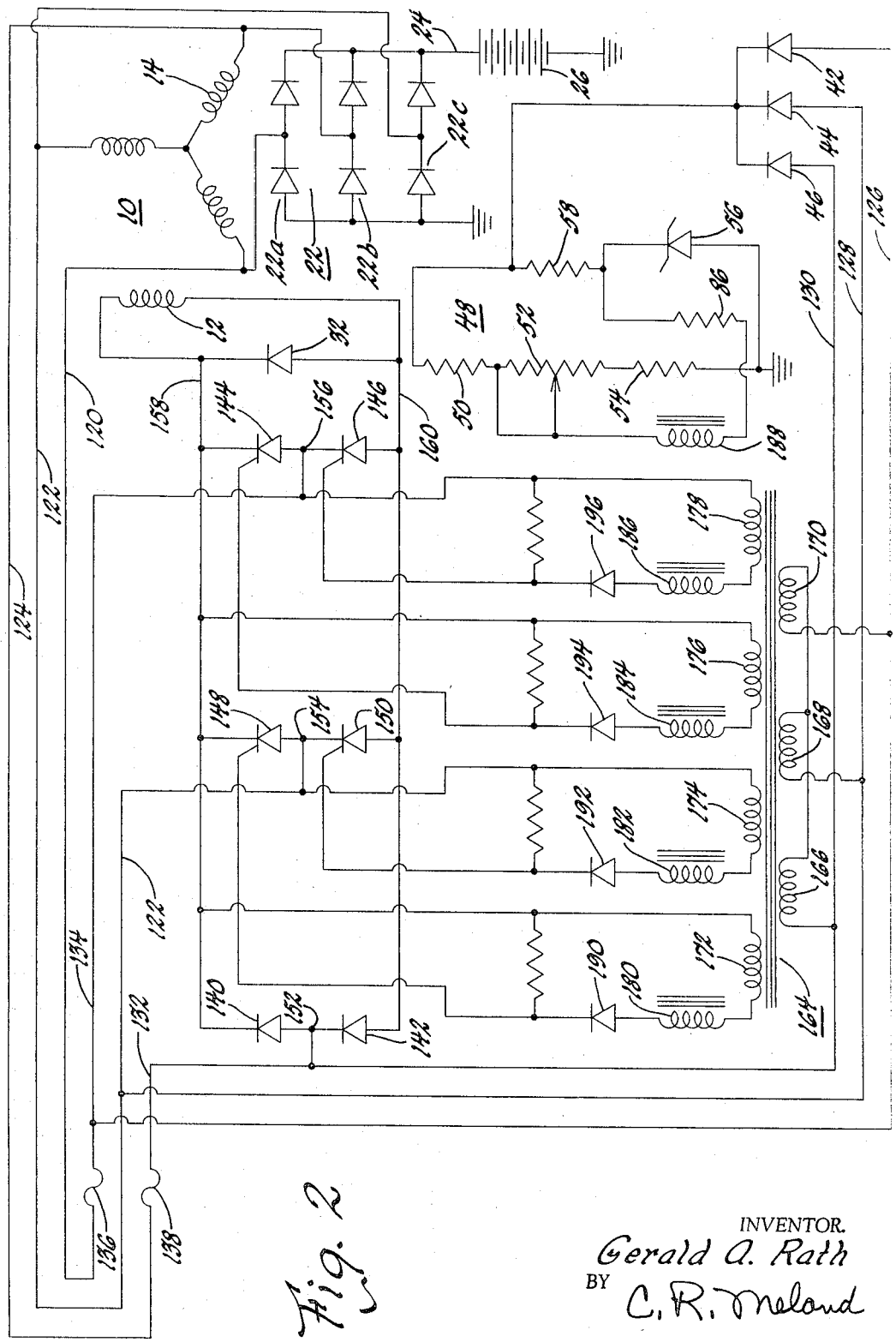
FIGURE 2 is a schematic circuit diagram which is similar to FIGURE 1 but which has a three-phase input for supplying field power to the field of a generator.

Referring now to FIGURE 2, a modified controlled system is illustrated which is identical in many respects with the system of FIGURE 1 but which supplies three phase power to a bridge rectifier network that supplies the field winding of the generator. In FIGURE 2, the same reference numerals have been used as were used in FIGURE 1 to identify equivalent parts in each figure.

In FIGURE 2, the three phase Y-connected output winding 14 is connected with lead wires or conductors 120, 122 and 124. The output winding 14 feeds the three phase full-wave bridge rectifier network 22 which once more feeds the D.C. load 26.

The voltage sensing circuit of FIGURE 2 is the same as that of FIGURE 1 and is designated again by the reference numeral 48. This voltage sensing circuit is fed from diodes 42, 44 and 46 connected respectively with conductors 126, 128 and 130 which are fed from conductors 132, 122, and 134. A circuit breaker which takes the form of a fuse 136 is connected between conductors 120 and 134 and another circuit breaker 138 which takes the form of a fuse is connected between conductors 124 and 132.

The field winding 12 of the A.C. generator 10 is fed from a three phase full-wave bridge rectifier network comprised of diodes 140, 142 and controlled rectifiers 144, 146, 148 and 150. The input terminals for this bridge rectifier are junctions 152, 154, and 156 which are connected respectively with the three phase A.C. conductors 132, 122 and 134. The output terminals for the bridge rectifier network that feeds the field winding 12 are the conductors 158 and 160. A transient voltage suppressing diode 32 is connected across the field winding 12 in the same manner as shown in FIGURE 1.

The gate voltage for controlled rectifiers 144, 146, 148 and 150 is taken from A.C. conductors 126, 128 and 130 through a transformer 164 which has primary windings 166, 168 and 170 and which has secondary windings 172, 174, 176 and 178. It can be seen that the secondary windings 172, 174, 176 and 178 are connected with the gate or load windings 180, 182, 184 and 186 of a magnetic amplifier which has a control winding 188. All of the load windings and the control winding are linked by magnetic cores such that each load winding is wound on a separate core and these cores are magnetically linked to the control winding 188 either by a single common control winding or by separate series connected control windings. The gate or load windings 180 through 186 are connected in series respectively with diodes 190, 192, 194 and 196 the opposite sides of which are respectively connected with the gate electrodes of controlled rectifiers 148, 150, 144 and 146. It can be seen that the one side of the secondary winding 172 is connected with the cathode of controlled rectifier 148. In a similar fashion, the one side of secondary winding 174 is connected with the cathode of controlled rectifier 150 while the one side of secondary winding 176 is connected with the cathode of controlled rectifier 144. One side of secondary winding 178 is connected with the cathode of controlled rectifier 146.

The operation of the system of FIGURE 2 is identical with the system shown in FIGURE 1 in that the amount of current supplied to the field winding 12 is a function of the time that the controlled rectifiers are turned on. This time of turn on is again controlled by a magnetic amplifier having a control winding fed from the voltage reference bridge network 48 which has a D.C. input voltage that is proportional to the output voltage of the output winding 14.

The system of FIGURE 2 has the same fail-safe feature as the system of FIGURE 1. Thus, if one of the controlled rectifiers, for example, controlled rectifier 148 should become shorted, a circuit is completed which will cause the circuit breaker 138 to open. This circuit can be traced from lead wire 124, through the circuit breaker 138, through lead wire 132, through junction 152, through diode 140, through the shorted controlled rectifier 148, through lead wire 122, and then back to lead wire 124 through the phase windings of the output winding 14.

The current rating of diodes 140 and 142 must be greater than that of the circuit breakers or fuses 136 and 138.

The three phase circuit of FIGURE 2 results in a field voltage which most effectively utilizes the field winding. The single phase circuit of FIGURE 1 on the other hand results in a lower cost regulator with fewer components.

While the embodiment of the present invention as herein disclosed constitutes a preferred form, it is to be understood that other forms might be adopted.

What is claimed is as follows:

1. An electrical system comprising, an alternating current generator having a three phase Y-connected output winding and a field winding, a bridge rectifier network comprised of four controlled rectifiers and two diodes, said bridge rectifier network having first, second and third A.C. input terminals and first and second direct current output terminals, said first A.C. input terminal being connected with the cathode of one of said controlled rectifiers and the anode of another controlled rectifier, said second A.C. input terminal being connected with the cathode of one of said controlled rectifiers and the anode of another controlled rectifier, said third A.C. input terminal being connected with the anode of one of said diodes and the cathode of the other of said diodes, the cathodes of two controlled rectifiers and the cathode of one diode being connected to said first direct current output terminal, the anodes of the other controlled rectifiers and the anode of the other diode being connected to said second direct current output terminal, means connecting said field winding across said first and second direct current output terminals of said bridge network, means connecting the phase windings of said output winding respectively to the A.C. input terminals of said bridge rectifier network, and means responsive to the output voltage of said output winding for controlling the conduction of said controlled rectifiers whereby the current supplied to said field winding is a function of the output voltage of said output winding.

2. An electrical system comprising, an alternating current generator having an output winding and a field winding, a bridge rectifier network comprised of at least two controlled rectifiers and two diodes, said bridge rectifier network having first and second A.C. input terminals and first and second direct current output terminals, said first A.C. input terminal being connected with the cathode of one of said controlled rectifiers and the anode of the other controlled rectifier, said second A.C. input terminal being connected with the anode of one of said diodes and the cathode of the other of said diodes, the cathode of one controlled rectifier and the cathode of one diode being connected to said first direct current output terminal, the anode of the other controlled rectifier and the anode of the other diode being connected to said second direct current output terminal, means connecting said output winding with said A.C. input terminals of said bridge network, means connecting said field winding across said first and second direct current output terminals of said bridge network, and means responsive to the output voltage of said output winding for controlling the conduction of said controlled rectifiers whereby the current supplied to said field winding is a function of the output voltage of said output winding, said last-named means including rectifier means for providing a direct current signal and a Zener diode.

References Cited by the Examiner

UNITED STATES PATENTS 2,525,451 10/1950 Graves _____ 322—28
3,161,817 12/1964 Carlson _____ 322—77
3,219,908 11/1965 Zarleng.

OTHER REFERENCES

G.E. Controlled Rectifier, 195.10, February 1962.

MILTON O. HIRSHFIELD, *Primary Examiner.*

J. J. SWARTZ, *Assistant Examiner.*